United States Patent
Golden et al.

(10) Patent No.: US 10,348,814 B1
(45) Date of Patent: Jul. 9, 2019

(54) EFFICIENT STORAGE RECLAMATION FOR SYSTEM COMPONENTS MANAGING STORAGE

(71) Applicant: Amazon Technologies, Inc., Reno, NV (US)

(72) Inventors: Robin Alan Golden, Western Cape (ZA); Marc Andrew Bowes, Western Cape (ZA); John Michael Morkel, Western Cape (ZA); Christopher Richard Jacques De Kadt, Western Cape (ZA)

(73) Assignee: Amazon Technologies, Inc., Reno, NV (US)

( * ) Notice: Subject to any disclaimer, the term of this patent is extended or adjusted under 35 U.S.C. 154(b) by 329 days.

(21) Appl. No.: 14/134,475

(22) Filed: Dec. 19, 2013

(51) Int. Cl.
*H04L 29/08* (2006.01)
*G06F 12/16* (2006.01)
*G06F 12/06* (2006.01)
*G06F 12/02* (2006.01)

(52) U.S. Cl.
CPC .......... *H04L 67/1008* (2013.01); *G06F 12/02* (2013.01); *G06F 12/0253* (2013.01); *G06F 12/06* (2013.01); *G06F 12/16* (2013.01)

(58) Field of Classification Search
CPC ....... G06F 12/02; G06F 12/0253; G06F 12/06
USPC ................. 709/223, 224, 225, 226
See application file for complete search history.

(56) References Cited

U.S. PATENT DOCUMENTS

| | | | |
|---|---|---|---|
| 7,325,233 B2 | 1/2008 | Kuck et al. | |
| 7,584,262 B1* | 9/2009 | Wang | H04L 12/4625 709/217 |
| 8,458,702 B1* | 6/2013 | Wu | G06F 12/0253 707/813 |
| 8,521,972 B1 | 8/2013 | Boyle et al. | |
| 8,527,544 B1 | 9/2013 | Colgrove et al. | |
| 8,527,558 B2 | 9/2013 | King et al. | |
| 8,892,610 B1* | 11/2014 | Pang | G06F 12/0253 707/813 |
| 9,037,703 B1* | 5/2015 | Wu | G06F 9/5027 370/252 |
| 2006/0143359 A1* | 6/2006 | Dostert | G06F 9/544 711/6 |
| 2006/0230087 A1 | 10/2006 | Andreasson | |

(Continued)

*Primary Examiner* — Joseph L Greene
(74) *Attorney, Agent, or Firm* — Robert C. Kowert; Meyertons, Hood, Kivlin, Kowert & Goetzel, P.C.

(57) ABSTRACT

Systems with multiple components managing storage may implement efficient storage reclamation. A storage reclamation event may be detected for a system component. An indication to a request dispatching mechanism may be made which indicates that the system component is unable to perform further tasks in order to perform storage reclamation. A storage reclamation operation, such as a stop-the-world garbage collection technique, or a service process restart may be performed to reclaim at least some storage. Upon completion of the storage reclamation operation, an indication may be made to the request distribution mechanism that the service process has resumed performing tasks for the system. In some embodiments, a gossip protocol communicating availability information to different nodes of a distributed system may provide information to schedule storage reclamation operations at different compute nodes of the distributed system.

20 Claims, 11 Drawing Sheets

(56) References Cited

U.S. PATENT DOCUMENTS

| | | | |
|---|---|---|---|
| 2007/0110063 A1* | 5/2007 | Tang | H04L 45/02 |
| | | | 370/390 |
| 2007/0156869 A1 | 7/2007 | Galchev et al. | |
| 2008/0059747 A1* | 3/2008 | Burckart | G06F 12/0253 |
| | | | 711/167 |
| 2008/0282254 A1* | 11/2008 | Blander | H04L 67/1029 |
| | | | 718/105 |
| 2010/0274885 A1* | 10/2010 | Yoo | H04L 67/1008 |
| | | | 709/224 |
| 2011/0276695 A1* | 11/2011 | Maldaner | H04L 41/00 |
| | | | 709/226 |
| 2015/0161056 A1* | 6/2015 | Deguillard | G06F 9/455 |
| | | | 711/6 |

\* cited by examiner

EFFICIENT STORAGE RECLAMATION FOR SYSTEM COMPONENTS MANAGING STORAGE

BACKGROUND

Distributing management of data storage among multiple system components lessens coordination burdens for systems. For example, network-based services are increasingly utilized to provide highly available solutions to common computing needs. Typically network-based services may utilize virtual hosts to provide easily configurable environments for implementing network-based operations and services. Virtualized hosts remove the necessity of interacting directly with underlying physical hardware, and instead manage in virtual fashion many of the various functions provided by physical machine. While the benefits of virtual machines lessen the burdens on developers to design and implement applications, virtual machines may also reduce performance processes operating the virtual environment. For example, virtual machines typically control various functions like memory management, reducing opportunities for application developers to optimize the performance of their applications. In effect, each virtual machine may manage the respective memory of the virtual machine without regard to the effect of memory management operations, such as memory reclamation, upon the wider distributed system. Similarly for other systems implementing distributed management of data storage, independent management may lead to sub-optimal performance of the system, as the timing of individual storage management operations may be inefficient with respect the system as a whole.

Figure 1:
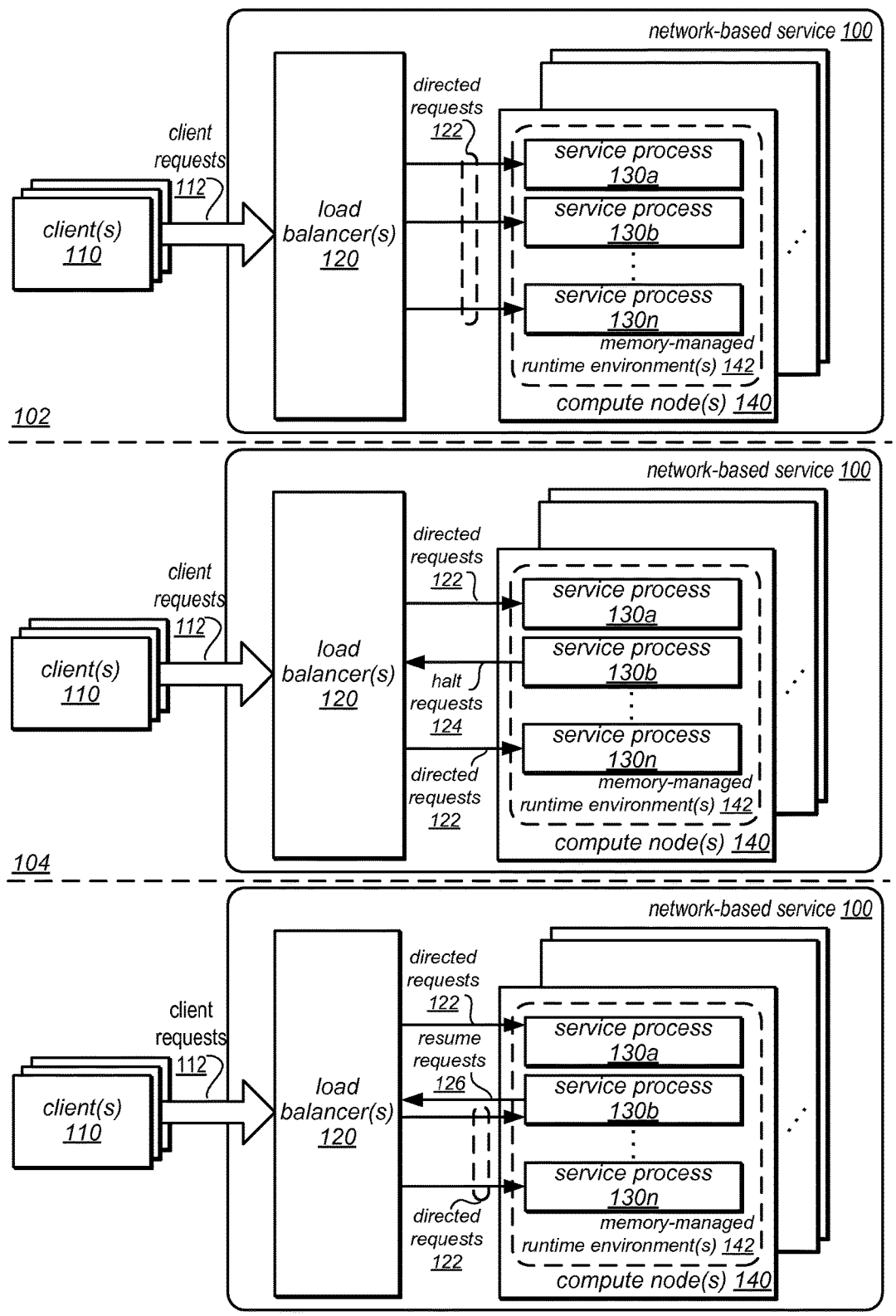
FIG. 1 is series of block diagrams illustrating efficient storage reclamation for system components managing storage for memory-managed runtime environments implementing a network-based service, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to efficient storage reclamation for system components managing storage. Various types of systems or devices may manage storage among multiple components in a system. In some embodiments, a distributed system, for example, may include multiple different nodes, servers, or other computing devices, each of which may manage system memory (a type of storage) that is used as part of performing various tasks for the distributed system. Alternatively, in some embodiments. a single request dispatcher (e.g., a load balancer or storage virtualization control) may direct tasks to multiple different components that manage storage. Storage operations (e.g., writing, moving, or deleting data) performed in these different systems may eventually lead to scenarios where storage space may need to be reclaimed. Storage reclamation events may be detected for system components and storage reclamation operations may be performed to reclaim storage for the system components. Storage reclamation operations may be performed efficiently (e.g., at different times) among the system components, which may lead to greater performance of the system while still managing storage for the system.

Consider the following example. In various embodiments, memory-managed runtime environments (which may implement a network-based service) may implement efficient storage reclamation (e.g., by efficiently reclaiming memory for the service process). A memory-managed runtime environment may implement a service process for a network-based service. Memory may be managed by the environment such that service processes performing in the environment need not perform various memory management functions. Various memory-management runtime environments are well-known to those of ordinary skill in the art, such as including, but not limited to the Java Virtual Machine, and other memory managed languages such as C#. Memory is allocated to the service process in the environment and utilized over time by the process. As time passes, some portions of the memory are no longer used, but are not free to be utilized. Thus reclamation operations may be performed to reclaim the unused memory, freeing the memory for future use.

Typically, run-time memory management environments perform reclamation operations, such as garbage collection, independently. For example, some environments halt processing to perform garbage collection delaying all running processes until garbage collection is complete. Another technique implements background garbage collection, which delays the overall performance of processing as a portion of compute resources are consistently devoted to garbage collection. For network-based services, unpredictable garbage collection can lead to poor performance for servicing client requests.

FIG. 1 is series of block diagrams illustrating efficient memory reclamation for memory-managed runtime environments implementing a network-based service, according to some embodiments. A network-based service 100, such as various computing resources, applications, data storage, databases, simulation or other applications or services may be implemented a plurality of compute nodes 140 (such as computing system 2000 in FIG. 11). These nodes 140 may implement memory-managed runtime environments 142 in which various service process 130a, 130b, through 130n may perform to implement the various functions of network-based service 100. Network-based service 100 may also implement a load balancer(s) 120 which may direct requests from clients 112 to various service processes 130 for processing. Clients 110 may be clients of the network-based service 100 and configured to utilize the service via client requests 112.

As illustrated at scene 102, client requests 112 are sent to load balancer 120 which may then direct requests 122 to service processes 130 for performance, such as according to a load balancing scheme. In some embodiments, load balancer(s) 120 may multiple different components, systems, or devices which provide load balancing functions network-based service requests. Over time servicing these requests, service processes 130 may consume enough memory to trigger a memory reclamation event. A memory reclamation event may be detected, in some embodiments, when an amount of available memory for a service process 130 is below a reclamation threshold. As illustrated at scene 104, service process 130b has detected a memory reclamation event. In order to perform a memory reclamation operation to reclaim memory for service process 130b, a halt request may be sent (or indicated to) load balancer 120. Load balancer 120 may then remove service process 130b from a load balancing scheme so that service client requests 112 are directed 122 to other service processes, such as service process 130a and 130n. A memory reclamation operation, such as performing a stop-the world garbage collection technique, or a service process restart of process 130b may be performed to reclaim system memory for service process 130b. In some embodiments, the memory reclamation operation may be performed according to a scheduling instruction. As illustrated in scene 106, upon completion of the memory reclamation operation, a request to resume processing of service requests 126 may be sent to the load balancer 120 such that directed requests 122 may again be sent to service process 130b for processing.

Please note that previous descriptions are not intended to be limiting, but are merely provided as an example of efficient storage reclamation for memory-managed runtime environments implementing network-based services. Other systems of multiple components (e.g., distributed systems with multiple "bare metal" machines, storage controllers for multiple block-based storage devices) may implement efficient storage reclamation for system components managing storage. Furthermore, variances, such as the number of clients, service processes, or location of load balancer may also be different than illustrated in FIG. 1.

This specification begins with a general description of systems with multiple system components implementing a request dispatching mechanism, such as various network-based services, such as those which may be provided by a provider network, and which may implement efficient storage reclamation techniques. An example of a virtual computing service is then discussed that implements efficient storage reclamation techniques, including different components/modules, or arrangements of components/module that may be employed as part of implementing a virtual computing service. Another general description of a distributed systems implementing efficient memory reclamation among multiple compute nodes of the distributed system using a gossip protocol is also discussed. Then, discussion of a number of different methods and techniques to implement efficient memory reclamation techniques for memory-managed runtime environments implementing network-based services is provided, some of which are illustrated in accompanying flowcharts. Finally, a description of an example computing system upon which the various components, modules, systems, devices, and/or nodes may be implemented is provided. Various examples are provided throughout the specification.

Figure 2:
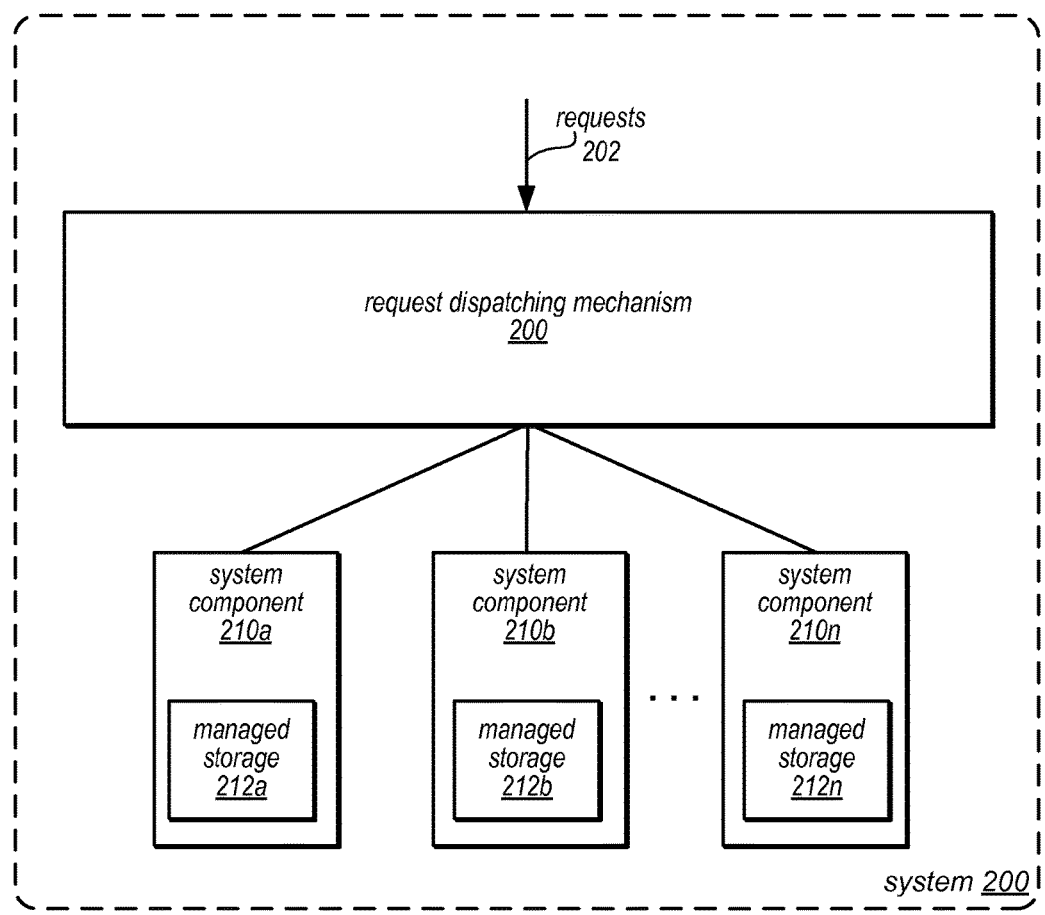
FIG. 2 is a block diagram illustrating efficient storage reclamation for system components managing storage with a request dispatching mechanism, according to some embodiments.

FIG. 2 is a block diagram illustrating efficient storage reclamation for system components managing storage with a request dispatching mechanism, according to some embodiments. In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given system component (e.g., a component of the data storage service or a component of the storage service) may be implemented by a particular node or may be distributed across several nodes. In some embodiments, a given node may implement the functionality of more than one service system component (e.g., more than one key value data store component). In some embodiments, a single component may represent a single storage device, or other component, along with other storage devices or components that operate within a single computing system or device.

Generally speaking, requests 202 may be any request to perform a particular task (which may be performed by one or more of system components 210 of system 200). Requests 202 may be received at a request dispatching mechanism which may be any device or component configured to direct request to a particular system component 210 to perform. In some embodiments, request dispatching mechanism 200 may be a RAID controller or other component configured to dispatch storage requests among multiple block storage devices 210. While in some embodiments, requests 202 may be requests to perform tasks at a particular system, device, or process, such as the virtual systems implementing network-based services described in further detail below with regard to FIG. 3 and received at a request dispatching mechanism 200 acting as a load balancer.

System components 210, such as components 210a, 210b through 210n may be implemented as part of system 200, each including respective managed storage 212, such as managed storage 212a, 212b through 212n. For example, each system component 210 may be a block-based storage device (e.g., a hard-disk drive or solid-state drive) that performs various types of garbage collection, defragmentation, or other storage management techniques to reclaim storage space. When a storage reclamation event is detected for particular system component 210a, an indication may be provided to request dispatching mechanism 200, such as discussed in further detail below with regard to FIG. 6, indicating that system component 210a is to perform a storage reclamation technique and/or is unable to perform tasks for system 200 (e.g., write new data or read new data).

In some embodiments, system 200 may be a system that implements a network-based service or other distributed system with a central request dispatching mechanism 200. A network-based service may, in some embodiments, be implemented as part of a network-based services platform. A provider network may implement network-based services implemented using memory-managed runtime environments and implementing efficient storage reclamation techniques, discussed above with regard to FIG. 1. A provider network may include a network-based services platform, and may be configured to communicate with network-based services. A virtualized computing service and distributed data storage service implemented as part of a network-based services platform may also be configured to interact with other systems, components or entities, such as other virtual computing services and/or clients.

In various embodiments, a number of clients may be configured to interact with a network-based services platform in a provider network via a network which may ultimately generate service requests. A provider network may include numerous data centers (which may be distributed across different geographical regions) hosting various resource pools, such as collections of physical and/or virtualized computer servers, storage devices, networking equipment and the like, needed to implement, configure and distribute the infrastructure and services offered by the provider. A network-based services platform may be configured to interface with one or more instances of a virtualized computing service, distributed data storage service, and/or one or more other virtual computing services.

In some embodiments clients may encompass any type of client configurable to submit network-based services requests to network-based services platform via network, including requests for data storage services (e.g., a request to generate a snapshot, etc.). For example, a given client may include a suitable version of a web browser, or may include a plug-in module or other type of code module configured to execute as an extension to or within an execution environment provided by a web browser. Alternatively, a client (e.g., a computational client) may encompass an application such as a database application (or user interface thereof), a media application, an office application or any other application that may make use of persistent storage resources to store and/or access one or more distributed databases or other computing services. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client may be an application configured to interact directly with network-based services platform. In some embodiments, client may be configured to generate network-based services requests according to a Representational State Transfer (REST)-style network-based services architecture, a document- or message-based network-based services architecture, or another suitable network-based services architecture. In some embodiments, clients may be other distributed systems, such as distributed databases that may access virtualized computing service directly, or through network-based services platform.

In some embodiments, a client may be configured to provide access to network-based services, such as virtualized computing service described below with regard to FIG. 3, distributed data storage service, and/or other virtual computing services in a manner that is transparent to those applications. For example, client may be configured to interact with a distributed database implemented as part of distributed data storage service, or perform computational operations on compute resources of virtualized computing service.

Clients may convey network-based services requests (e.g., data access request) to and receive responses from a network-based services platform via a network. In various embodiments, a network may encompass any suitable combination of networking hardware and protocols necessary to establish network-based communications between clients and a platform 200. For example, a network may generally encompass the various telecommunications networks and service providers that collectively implement the Internet. A network may also include private networks such as local area networks (LANs) or wide area networks (WANs) as well as public or private wireless networks. For example, both a given client and a network-based services platform may be respectively provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a networking link between a given client and the Internet as well as between the Internet and a network-based services platform. It is noted that in some embodiments, clients may communicate with a network-based services platform using a private network rather than the public Internet.

Generally speaking, a network-based services platform may be configured to implement one or more service endpoints configured to receive and process network-based services requests, such as requests to access data (or records thereof). For example, a network-based services platform may include hardware and/or software configured to implement a particular endpoint, such that an HTTP-based network-based services request directed to that endpoint is properly received and processed. In one embodiment, a network-based services platform may be implemented as a server system configured to receive network-based services requests from clients and to forward them to components of a system that implements a virtualized computing service, distributed data storage service and/or another virtual computing service for processing. In other embodiments, a network-based services platform may be configured as a number of distinct systems (e.g., in a cluster topology) implementing load balancing and other request management features configured to dynamically manage large-scale network-based services request processing loads. In various embodiments, a network-based services platform may be configured to support REST-style or document-based (e.g., SOAP-based) types of network-based services requests.

In addition to functioning as an addressable endpoint for clients' network-based services requests, in some embodiments, a network-based services platform may implement various client management features. For example, a platform may coordinate the metering and accounting of client usage of network-based services, including storage resources, such as by tracking the identities of requesting clients, the number and/or frequency of client requests, the size of data (such as database tables or records thereof) stored or retrieved on behalf of clients, overall storage bandwidth used by clients, class of storage requested by clients, or any other measurable client usage parameter. A network-based services platform may also implement financial accounting and billing systems, or may maintain a database of usage data that may be queried and processed by external systems for reporting and billing of client usage activity. In certain embodiments, a platform may be configured to collect, monitor and/or aggregate a variety of distributed key value data store 210 and computing service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data or records thereof (e.g., size, data type, etc.), or any other suitable metrics. In some embodiments such metrics may be used by system administrators to tune and maintain system components, while in other embodiments such metrics (or relevant portions of such metrics) may be exposed to clients to enable such clients to monitor their usage of a virtualized computing service, distributed data storage service and/or another virtual computing service (or the underlying systems that implement those services).

In some embodiments, a network-based services platform may also implement user authentication and access control procedures. For example, for a given network-based services request to access a particular portion of data, such as a particular compute cluster, a platform may be configured to ascertain whether the client associated with the request is authorized to access the particular compute cluster. In some embodiments, another virtual computing service of a network-based services platform may be an authentication and/or access management service that may determine the identity of a requesting client. A network-based services platform may determine such authorization by, for example, evaluating an identity, password or other credential against credentials associated with the particular database, or evaluating the requested access to the particular database against an access control list for the particular data. For example, if a client does not have sufficient credentials to access the particular compute cluster, a platform may reject the corresponding network-based services request, for example by returning a response to the requesting client indicating an error condition. Various access control policies may be stored as records or lists of access control information.

It is noted that while a network-based services platform may represent the primary interface through which clients may access the features of a virtualized computing service or distributed data storage service, it need not represent the sole interface to such features. For example, an alternate API that may be distinct from a network-based services interface may be used to allow clients internal to the enterprise providing the computing service to bypass a network-based services platform.

Figure 3:
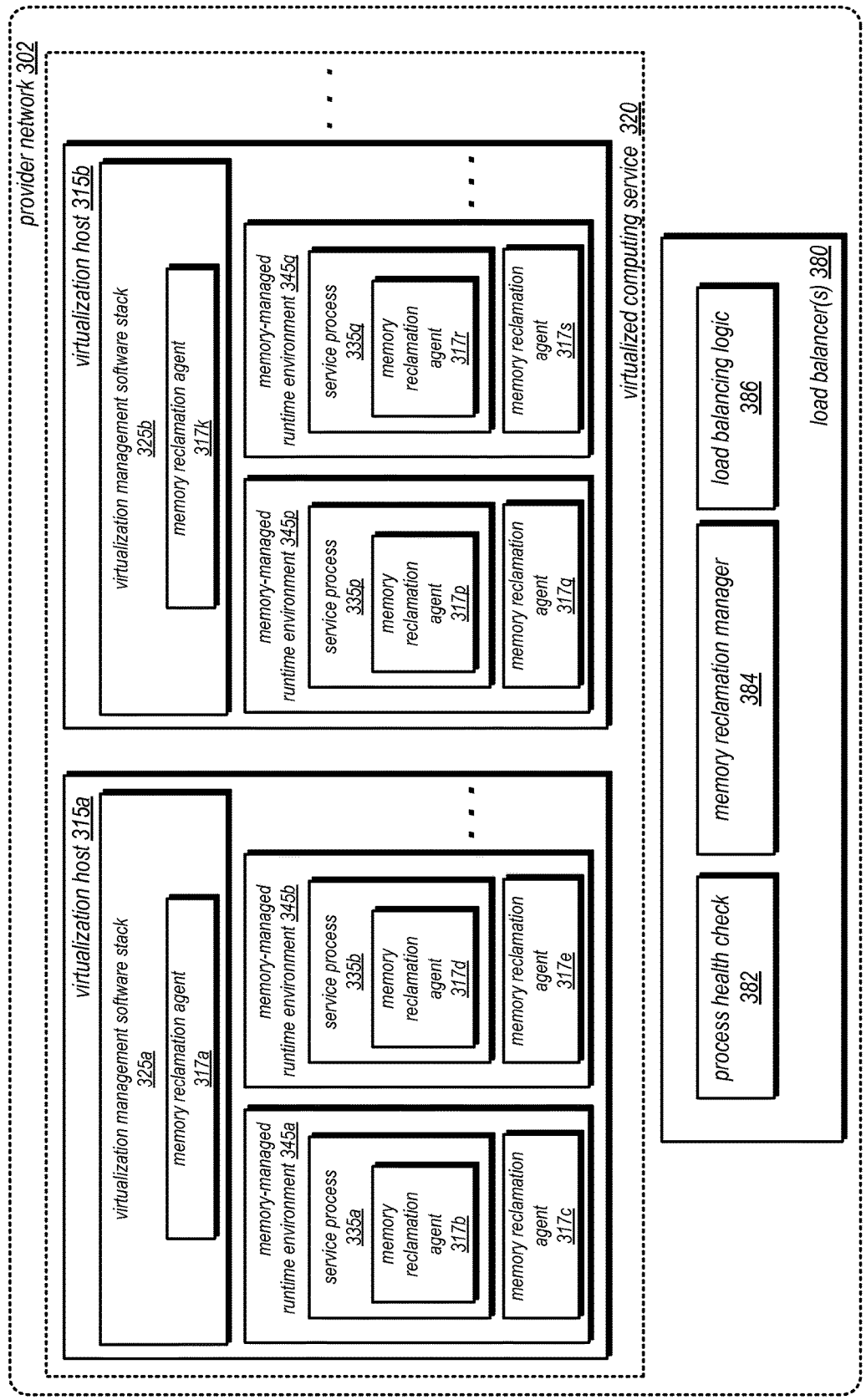
FIG. 3 is a block diagram illustrating a virtualized computing service implementing efficient storage reclamation for memory-managed runtime environments, according to some embodiments.

FIG. 3 is a block diagram illustrating a virtualized computing service implementing efficient storage reclamation for memory-managed runtime environments, according to some embodiments. In some embodiments, virtualized compute service 320 may implemented as part of a network-based services platform, such as may be implemented by provider network 302. Provider network 302 may be a plurality of network-accessible services may be implemented, including for example a virtualized computing service 320, one or more storage services, one or more networking-related services, one or more data storage services and the like. The virtualized computing service 320 includes a plurality of virtualization hosts 315, such as hosts 315A and 315B in the depicted embodiment. Each virtualization host 315 may in turn include a virtualization management software stack (VMSS) 325, such as VMSS 325A on host 315A and VMSS 325B on host 315B, as well as one or more memory-memory managed runtime environments. As shown, host 315A includes memory-memory managed runtime environments 345A and 345B, while host 315B includes memory-memory managed runtime environments 345P and 345Q. Each of the memory-memory managed runtime environments 345 may comprise its own operating system, and may be used for various client applications. A VMSS may comprise various components, including for example a hypervisor and/or an operating system instance that is to be used for administrative purposes rather than for client application execution.

Memory-managed runtime environments 345 may provide an environment in which service processes 335 may run. Each memory-managed runtime environment 345 may implement a respective service process 335, such as 335a for memory-managed runtime environment 345a, service process 335b in memory-managed runtime environment 345b, service process 335p in memory-managed runtime environment 345p, and service process 335q in memory-managed runtime environment 345q. Service processes 335 may perform various functions for a network-based service. For virtual computing service, for example, the service processes may perform such as front end operations, such as request routing to other compute nodes, metering service usage for clients of the service, performing authentication and/or verification of requests.

In various embodiments, a memory reclamation agent 317 may be implemented by various components of virtualized computing service 320 to perform efficient memory reclamation techniques. Memory reclamation agent 317 may be any combination of hardware and/or software configured to perform techniques such as those illustrated below in FIGS. 6, 7, 8 and 10. For example, memory reclamation agent 317 may detect memory reclamation events, request or indicate that particular service process is unavailable in order to perform memory reclamation. Memory reclamation agent 317 may schedule the performance of memory reclamation operations or perform memory reclamation operations according to received scheduling instructions, such as may be sent by memory reclamation manager 384. Memory reclamation agent 317 may also perform or direct the performance of memory reclamation operations, and send indications to the load balancer 380 that a service process has resumed processing of service requests. Memory reclamation agents 317 may receive availability information for other virtualization hosts 315 or service processes 335 via a gossip protocol among virtualization hosts 315 and/or processes 335 that includes availability information about when a particular host 315 and/or process 335 is available to perform tasks for the virtualized computing service 320.

Memory reclamation agent may be implemented in one or more locations. For example, in some embodiments, memory reclamation agent 317 may be implemented as part of the VMSS 325, such as memory reclamation agent 317a and memory reclamation agent 317k. Such an implementation may allow memory reclamation agent 317a or 317k to monitor and perform memory reclamation for multiple service processes 335. In some embodiments, memory-managed environments 345 may implement memory reclamation agent 317, such as memory reclamation agent 317c, memory reclamation agent 317e, memory reclamation agent 317q, and memory reclamation agent 317s. In some embodiments, the service process 335 itself may incorporate and perform the techniques of memory reclamation agent 317, such as illustrated by memory reclamation agent 317b, memory reclamation agent 317d, memory reclamation agent 31'7p, and memory reclamation agent 317r.

Provider network 302 may implement load balancer 380 to direct requests to different service processes 335 for processing. In some embodiments, load balancer 380 may implement a memory reclamation manager 380 which may perform the various techniques illustrated in FIGS. 6, 7, and 8. For example, in some embodiments, memory reclamation manager 384 may maintain state information for service processes and currently scheduled or performing reclamation operations. Schedule instructions may be generated and sent to memory reclamation agents 317 or the state information (or availability information) itself may be sent to memory reclamation agents 317 for self-scheduling. Load balancer(s) 380 may also implement a process health check 382 module that sends heartbeat requests, health check/status requests, or other similar such requests to determine whether a particular service process 335 and/or virtualization host 315 is available to perform tasks (e.g., receiving a response back from the respective process 335 and/or host 315). Load balancer(s) 380 may also implement load balancing logic 386 module to perform request dispatching among service processes 335 and/or virtualization hosts 315 according to various load balancing schemes, such as described below in further detail with regard to FIG. 8.

Figure 4A:
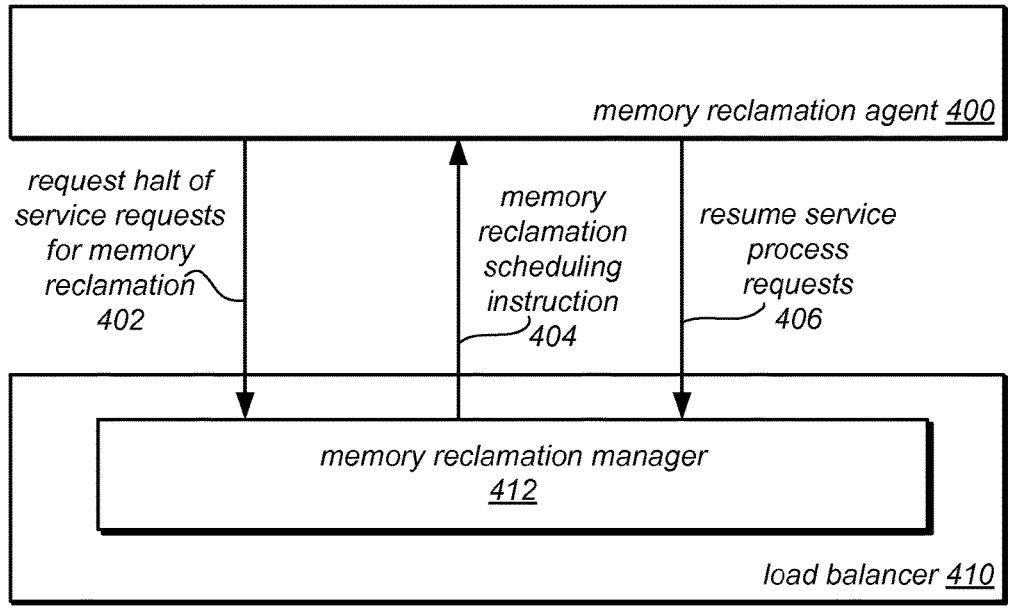
FIGS. 4A and 4B are block diagrams illustrating interactions between memory reclamation agents and a memory reclamation manager in order to perform efficient storage reclamation for memory-managed runtime environments implementing network-based services, according to some embodiments.
Figure 4B:
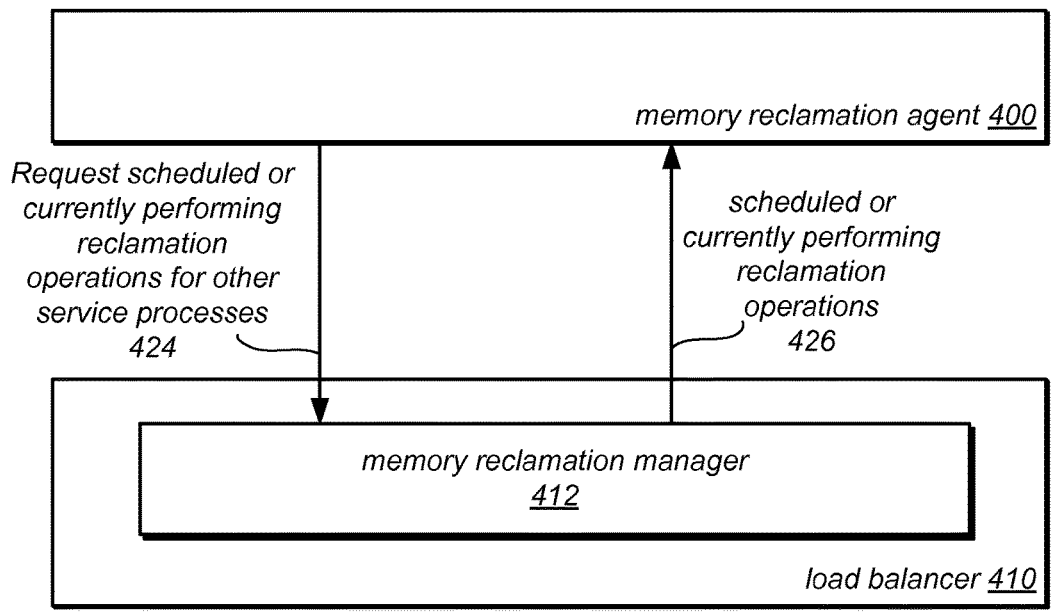

FIGS. 4A and 4B are block diagrams illustrating interactions between memory reclamation agents and a memory reclamation manager in order to perform efficient storage reclamation for memory-managed runtime environments implementing network-based services, according to some embodiments. As illustrated in FIG. 4A, upon detection of a memory reclamation event, a memory reclamation agent 400 may send a request to halt service requests 420 in order for the memory reclamation agent 400 to perform a memory reclamation operation for the service process to memory reclamation manager 412 implemented at load balancer 410. In some embodiments, memory reclamation manager 412 may generate a scheduling instruction and send the memory reclamation scheduling instruction to the memory reclamation agent 400. Memory reclamation agent 400 may perform the memory reclamation operation according to the received scheduling instruction and, upon completion, send a request to resume service process requests 406 to memory reclamation manager 412.

FIG. 4B illustrates interactions between a memory reclamation agent that performs scheduling for memory reclamation operations. For example, memory reclamation agent 400 may request currently scheduled and/or currently performing memory management operations 424 from the memory reclamation manager 412. As discussed above in FIG. 3, memory reclamation manager 412 may maintain state information about various service process nodes and scheduled/performing memory reclamation operations. Memory reclamation manager 412 may send scheduled or currently performing memory reclamation operations 426 to memory reclamation agent 400 in order to generate a scheduling instruction for the service process for which the memory reclamation agent performs memory reclamation.

Figure 5:
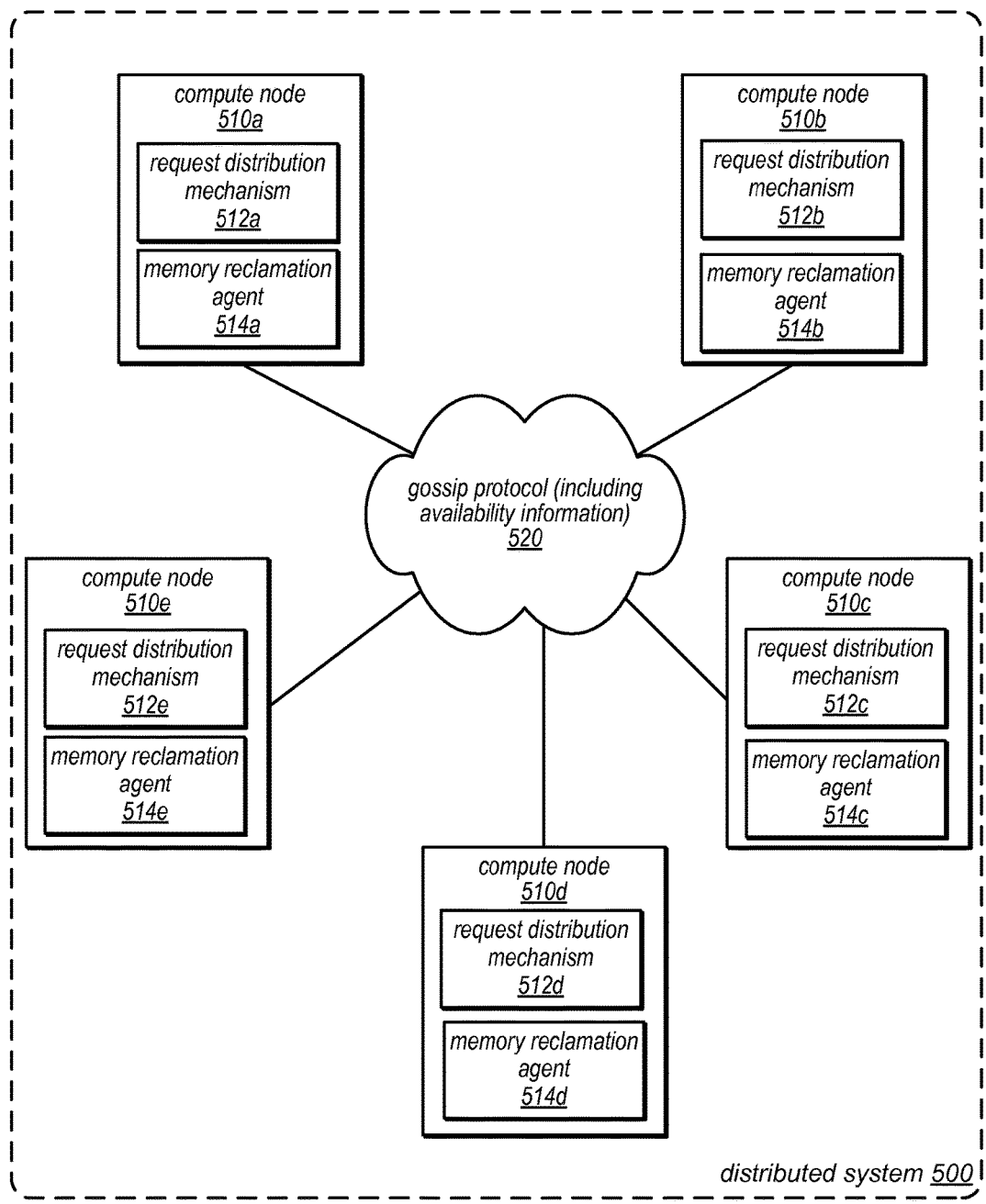
FIG. 5 is a block diagram illustrating efficient storage reclamation for compute nodes of a distributed system implementing a gossip protocol, according to various embodiments.

Turning to FIG. 5, in some embodiments, a single request distribution mechanism may not be implemented for multiple system components managing storage. For example, in some embodiments, a distributed system of compute nodes may implement a gossip protocol communicating availability information among compute nodes. This availability information may allow for each respective compute node to make determinations as to where or when to dispatch requests to perform tasks to other compute nodes in the distributed system. FIG. 5 is a block diagram illustrating efficient storage reclamation for compute nodes of a distributed system implementing a gossip protocol, according to various embodiments.

Distributed system 500 may include multiple compute nodes 510, such as compute nodes 510a, 510b, 510c, 510d, and 510e. Each compute node may be a different respective server, computing device, or "bare metal" system. In some embodiments, as discussed above with regard to FIG. 3, each compute node 510 may be a separate service process, virtual machine, or other virtualized component. Each compute node may implement a respective memory reclamation agent 514, such as memory reclamation agents 514a, 514b, 514c, 514d, and 514e, which may be configured to perform the various efficient storage reclamation techniques discussed below, such as with regard to FIG. 10. In some embodiments, each compute node 510 may also be configured to implement a request distribution mechanism 512, such as request distribution mechanisms 512a, 512b, 512c, 512d, and 512e. Request distribution mechanism 512 may, in some embodiments, direct requests to other compute nodes 510 to perform tasks for distributed system 500 based on availability information obtained via gossip protocol 520. Gossip protocol 520 may be any type of protocol, messaging, or other communication scheme between compute nodes 510 to provide availability information (e.g., whether a particular compute node 510 is available or unavailable to perform tasks for distributed system 510). Other information, such as scheduled downtime, or unavailability time, the particular tasks (e.g., a storage reclamation operation) or other health/status information may also be included in gossip protocol 520.

Figure 6:
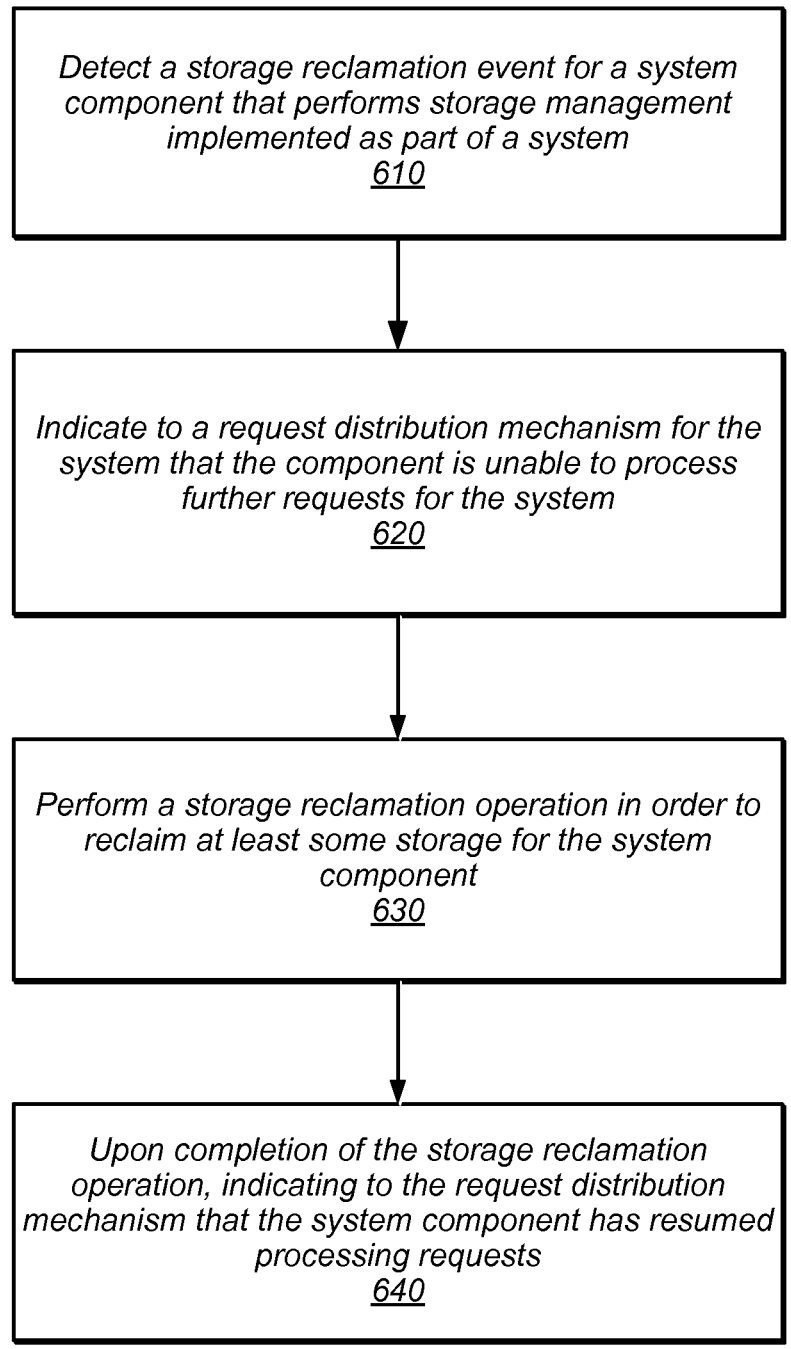
FIG. 6 is a high-level flowchart illustrating various methods and techniques for efficient storage reclamation for system components managing storage, according to various embodiments.

The examples of efficient storage reclamation for system components managing storage discussed above with regard to FIGS. 2-5 have been given in regard to examples of a network-based service providing a virtual compute service or a data storage service. A single request distribution mechanism or distribute request distribution mechanisms have also been discussed. However, various other types of systems may implement efficient storage reclamation for system components managing storage. FIG. 6 is a high-level flowchart illustrating various methods and techniques for efficient storage reclamation for system components managing storage, according to various embodiments. These techniques may be implemented using memory reclamation agents and/or managers as described above with regard to FIGS. 2-5, as well as other components of systems, and thus the following discussion is not intended to be limiting as to the other types or configurations of systems that may implement the described techniques.

As indicated at 610, a storage reclamation event may be detected for a system component that performs storage management implemented as part of a system. Please note, that storage as described herein may include any type of data storage, whether persistent, non-volatile, or volatile. Storage may include block-based storage devices (e.g., hard disk drives, solid-state drives, non-volatile system memory, such as battery-backed random access memory (RAM), phase-change RAM, or volatile system memory such as dynamic RAM or static RAM). For example, in some embodiments, a storage reclamation event may be detected for a block-based storage device implemented as part of an array of block-based storage devices that provide a virtualized storage volume as part of a system. The storage reclamation event may be triggered in response to a determination that number of available data blocks in the block-based storage device falls below a threshold. In some embodiments, a storage reclamation event may be triggered by a number of a particular type of storage operations performed (e.g., a number of delete operations), or an amount of time passed since a prior storage reclamation operation.

As indicated at 620, an indication may be made to a request distribution mechanism for the system that the component is unable to process further requests (or perform system tasks) for the system, in various embodiments. For example, the block-based storage device may send a notification to a storage virtualization controller that the device is unable to perform further storage actions (or may fail to respond to health check or other status request messages from the controller). As indicated at 630, in some embodiments, a storage reclamation operation may be performed in order to reclaim at least some storage for the system component, in some embodiments. For example, various different garbage collection techniques, compaction techniques, or other types of techniques may be used to move, reconfigure, or otherwise structure data still maintained in the system component to obtain more available storage. Upon completion of the storage reclamation operation, an indication may be made to the request distribution mechanism, indicating that the system component has resumed processing requests, as indicated at 640. For example, the block-based storage device may send a notification to a storage virtualization controller that the device is able to perform further storage actions (or may respond to health check or other status request messages from the storage virtualization controller).

Figure 7:
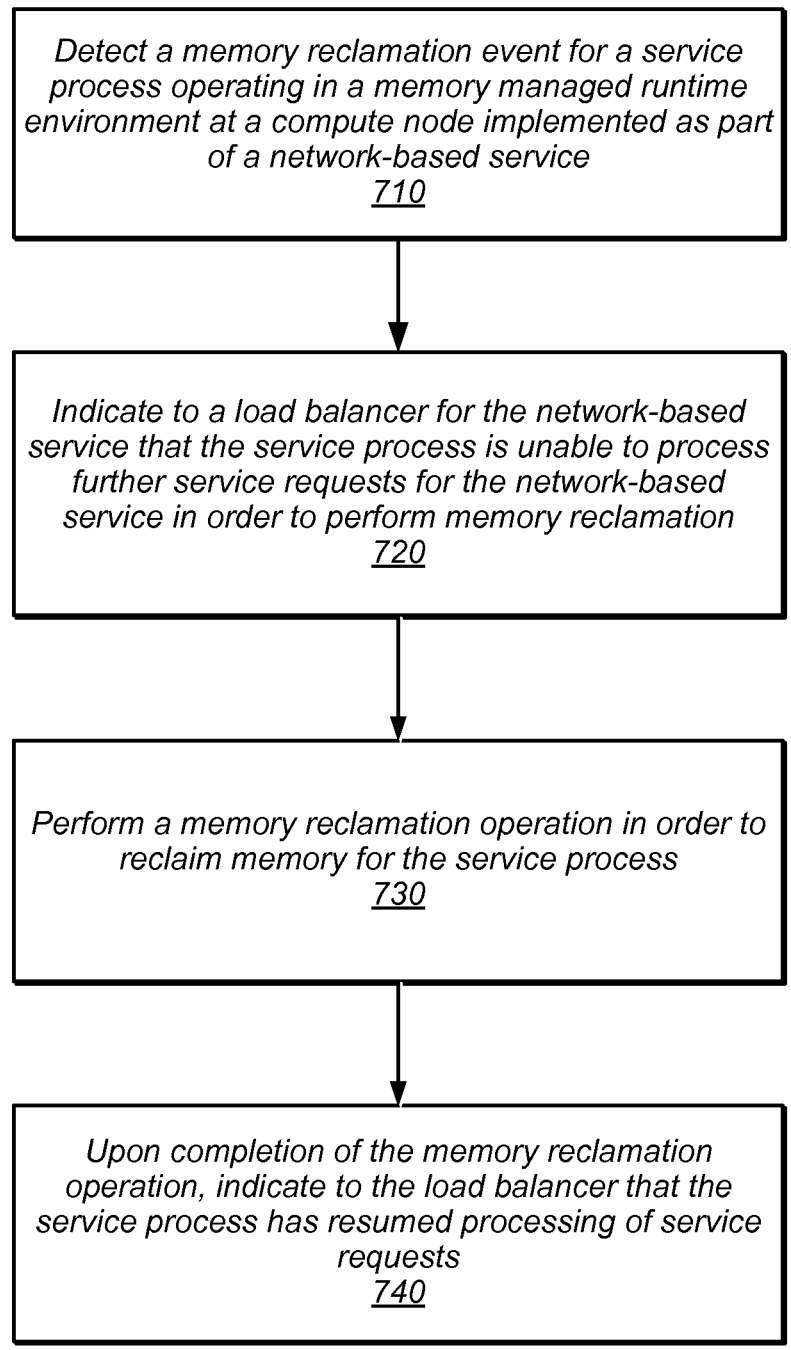
FIG. 7 is a high-level flowchart illustrating various methods and techniques for efficient storage reclamation for memory-managed runtime environments implementing network-based services, according to some embodiments.

As noted above, storage may include various forms of system memory. In some embodiments, system memory may be used to provide a memory managed runtime environment for service process, such as may be performed as part of a network-based service. FIG. 7 is a high-level flowchart illustrating various methods and techniques for efficient storage reclamation for memory-managed runtime environments implementing network-based services, according to some embodiments. As indicated at 710, a type of storage reclamation event, a memory reclamation event, may be detected for a service process in a memory-managed runtime environment implemented as part of a network-based service. A memory reclamation event may be detected in various ways. For example, in some embodiments, a reclamation threshold may be implemented. When an amount of available memory for the service process falls below the reclamation threshold, then a memory reclamation event may be triggered. Other means for detecting memory reclamation events include receiving one or more error or other messages about the available memory for the service process. For example, the virtual host may or memory-managed runtime environment implementing the service process may trigger a warning about lack of system memory. A memory reclamation event may also be triggered based on a time period, such as time elapsed since the last performance of a memory reclamation operation, or the workload of service requests, type of service requests, etc. . . . which the service process has processed.

In some embodiments, the reclamation threshold for triggering a detection of reclamation events may be set differently or randomly for different service processes implementing a network-based service. For example, if most service processes perform similar service requests, a need to perform memory reclamation to reclaim memory for the service process may occur at similar times. In order to prevent large numbers of service processes performing memory reclamation operations at or near the same time, the reclamation thresholds may be set in order to satisfy a latency requirement or availability requirement for the network-based service (e.g., a certain percentage or number service processes available at any given time). Similarly, in some embodiments, a same or similar reclamation threshold may be used, but a randomized or different delay or wait period may be enforced before performing a reclamation operation (or indicating to a load balancer). In various embodiments, reclamation thresholds may be set lower (requiring more available memory) when memory reclamation operations may be scheduled after detecting the reclamation event in order to provide additional memory to account for a delay in performing the memory reclamation operation.

As indicated at 720, an indication to a load balancer for the network-based service may be made indicating that the service process is unable to process further service requests for the network-based service in order to perform memory reclamation. An indication may be a halt request (or some other message or notification) to the load balancer, in some embodiments. Such a request may be formatted according to an API for load balancer interactions. An indication may, in some embodiments, be a cessation of heartbeat notifications (e.g., periodic or aperiodic status messages) sent to the load balancer to indicate that the service process is still available.

In various embodiments, a memory reclamation operation may then be performed for the service process, as indicated at 730. A memory reclamation process may generally be any process to reclaim system memory for the service process that is no longer used by the service process. Many memory reclamation operations are implemented by various garbage collection techniques, which are well-known to those of ordinary skill in the art. One such garbage technique that may be implemented in some embodiments, is a stop-the-world garbage collection technique. A stop-the-world garbage collection technique may halt processing of current service requests by the service process, perform garbage collection (e.g., using move and compact garbage collection), and then resume processing of service requests. In some embodiments, a delay or wait period may be implemented before performing the stop-the-world garbage collection technique. For example, short-lived service requests may be completed prior to performing the technique so as not to increase service latency. Long-running techniques, however, may in various embodiments be paused while garbage collection is performed.

In various embodiments, a memory reclamation technique may not be limited to a garbage collection technique. For example, in some embodiments, the service process itself may be restarted, releasing the currently acquired system memory for the service process, and restarting the service process to acquire new portions of system memory allocated to the service process. This memory allocation operation may be performed, in various embodiments, where the service requests are stateless. For example, if the process performs a single action that upon completion need not be retained, then a restart of the service process may be performed as the memory allocation operation. In various embodiments, in-flight requests may be performed prior to performing the restart. A wait period or delay may also be enforced prior to performing the restart.

In some embodiments, which memory reclamation operation to perform may be selected based on currently performing service requests. For example, if the service process is currently processing short-lived service requests that do not maintain state information, then a service process restart may be performed to reclaim memory. Alternatively, if a service request maintains state information or is long running, then the stop-the-world garbage collection technique may be performed. Another consideration may be the time required to perform a service process restart. If service process has a restart time longer than an average performance time for a stop-the-world garbage collection technique, then the stop-the-world garbage collection technique may be selected for the service process.

As indicated at 740, upon completion of the memory reclamation operation, an indication to the load balancer may be made indicating that the service process has resumed processing of service requests. As with element 720 above an API or other type of request, notification or message may be sent to the load balancer, such as a resume request to be directing service requests to the service process again. In some embodiments, heartbeat notifications to the load balancer may be resumed.

Figure 8:
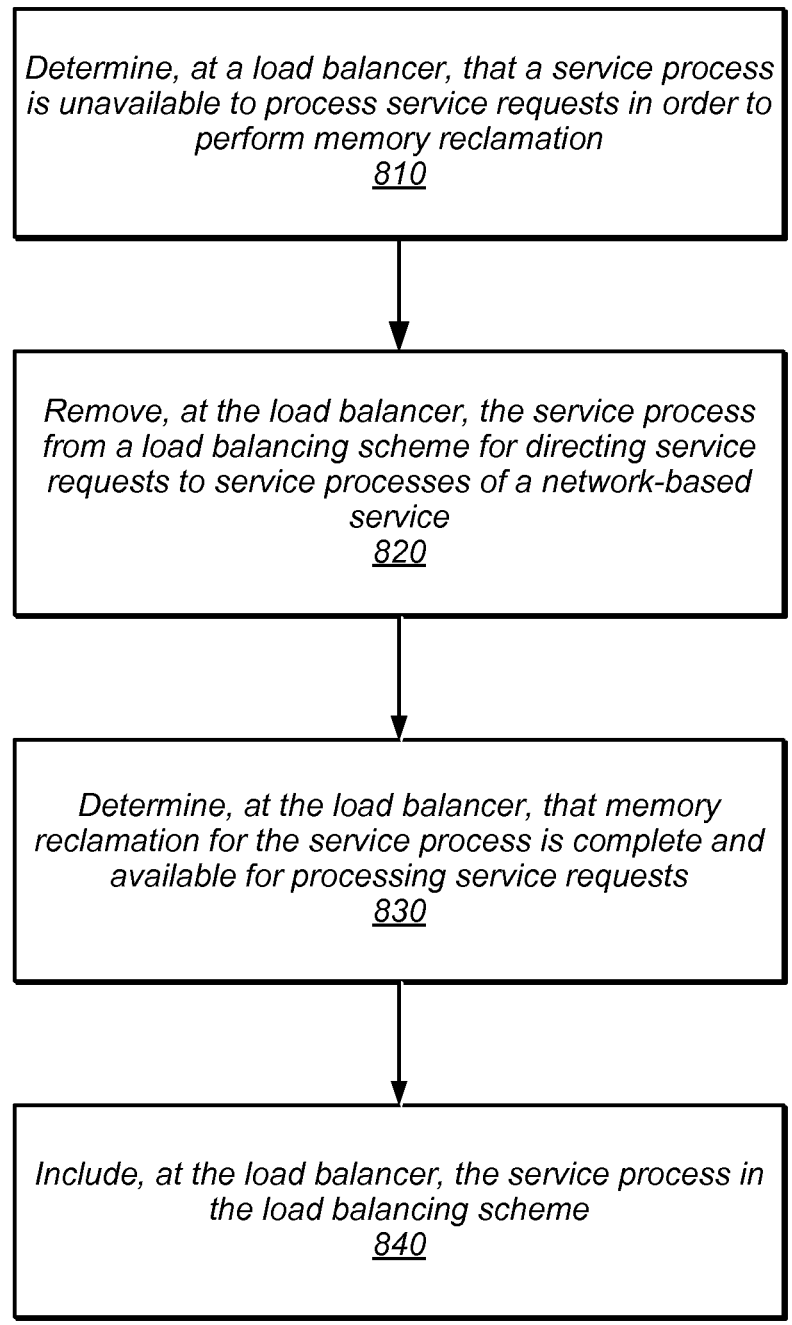
FIG. 8 is a high-level flowchart illustrating various methods and techniques for directing service requests at a load balancer to service processes in a network-based service that implement efficient storage reclamation techniques, according to some embodiments.

As noted above, load balancers may be generally considered to be any component, system or module that directs service requests to one of multiple other service requests in a network-based service. In some embodiments, a load balancer may be a single point of entry or service that acts as gatekeeper for requests directed toward the network-based service. While in other embodiments, a load balancer may be component of a cluster or distributed system of nodes that communicate between one another, choosing from among other nodes in the system to direct a service request. Wherever a load balancer is implemented, various techniques may be employed to direct service requests. FIG. 8 is a high-level flowchart illustrating various methods and techniques for directing service requests at a load balancer to service processes in a network-based service that implement efficient memory reclamation techniques, according to some embodiments. Although discussed in the context of a load balancer, the techniques discussed below with regard to FIG. 8 may be implemented more generally by any other type of request dispatching mechanism (as discussed above with regard to FIG. 2).

As indicated at 810, a service process may be determined to be unavailable to process service requests in order to perform memory reclamation at a load balancer, in various embodiments. For example, the various indications discussed above with regard to element 720 in FIG. 7, such as receiving, and then not receiving, heartbeat notifications, receiving other messages, notifications, or indications of a memory reclamation event occurring for a service, may be received. In some embodiments, a determination that a service process is unavailable (or that a memory reclamation event occurred) may be indirectly determined based on various status, performance, or historical data or information maintained about the service process (e.g., service process typically performs memory reclamation after process a certain number of requests).

As indicated at 820, the service process may then be removed from a load balancing scheme for directing service requests to service processes of a network-based service at the load balancer, in various embodiments. A load balancing scheme may be a simple as list, ordering, or rotation in which service requests are directed to different service processes (e.g., round robin or random selection). More sophisticated load balancing schemes may include various other factors, such as workload, recent response times, health status, number of active connections, geographic location, capabilities, or a number of recent assignments. In another example, for distributed systems implementing load balancers at individual compute nodes (e.g., in a cluster) to direct service requests to other compute nodes, the compute node or service process may be simply identified as unavailable to participate in the distributed system.

As indicated at 830, the memory reclamation operation may be determined to be complete for the service process and, thus, the service process may be available for processing service requests. For, example, completion of the service process may be determined by waiting a period of time, such as the time it takes to perform a process restart or an average stop-the-world garbage collection technique. An indication, such as the indication discussed above with regard to element 740 in FIG. 7, may also be received, such as a resume request, a resumption of heartbeat notifications, etc. . . . The service process may then be included back in the load balancing scheme at the load balancer, as indicated at 840.

Figure 9:
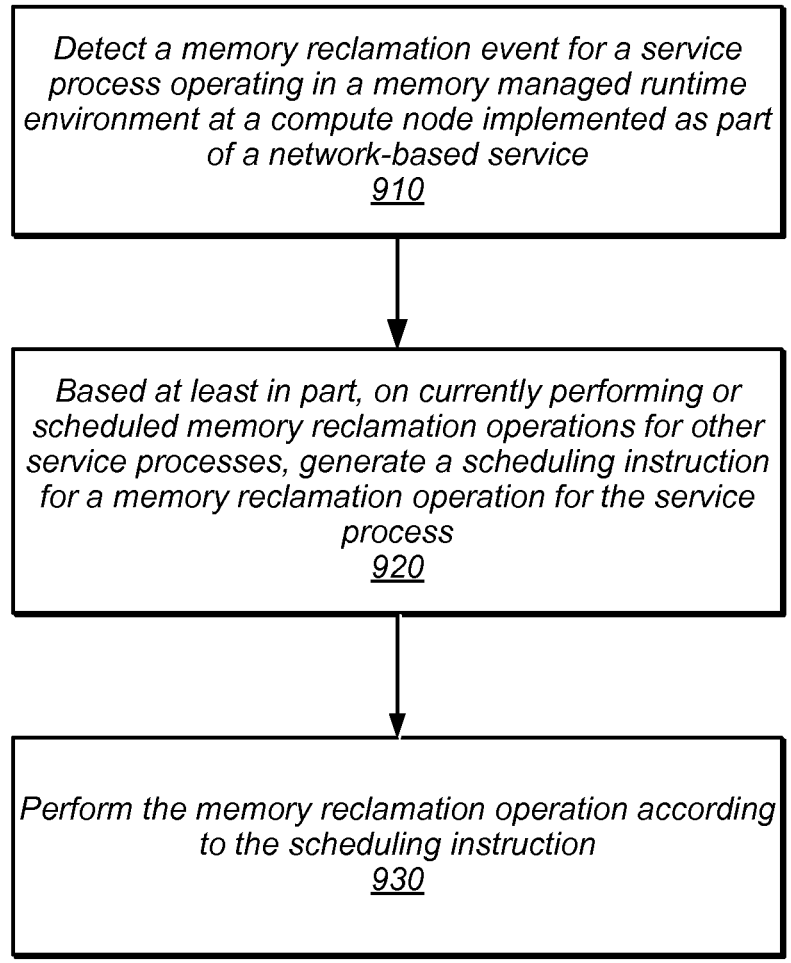
FIG. 9 is high-level flowchart illustrating various methods and techniques for scheduling memory reclamation operations, according to some embodiments.

As discussed above, efficient memory reclamation operations may be performed among services process on a same compute node or host, or among multiple different nodes or hosts, as in a distributed system. In order to maintain a high availability of service processes (such as to satisfy various latency or performance guarantees), different techniques may be implemented to ensure that different service processes are unavailable for processing requests in a coordinated or scheduled manner. For instance, as discussed above with regard to FIG. 7, different service processes may be implemented among different nodes of a distributed system, that each direct requests to one another (acting as load balancers by choosing from among multiple nodes to direct a particular service request). The different service processes may be able to schedule when to perform memory reclamation operations based on information obtained about memory reclamation operations currently scheduled and performed on other compute nodes. In another example, a dedicated load balancer system for multiple different nodes/service processes may maintain state information about memory reclamation operations that are performed/scheduled among the different processes, and thus be able to send scheduling instructions to the different processes for performing memory reclamation operations and/or provide information to the different processes in order for the process or node implementing the process to intelligently schedule the performance of reclamation operations. FIG. 9 is high-level flowchart illustrating various methods and techniques for scheduling memory reclamation operations, according to some embodiments. As with FIG. 8 above, the techniques discussed below with regard to FIG. 9 may also be implemented by system components (as discussed above with regard to FIG. 2) or compute nodes in a distributed system (as discussed above with regard to FIG. 5).

As indicated at 910, a memory reclamation event may be detected for a service process running in a memory-managed runtime environment implemented as part of a network-based service, in various embodiments. Similar to the discussion above of element 710 in FIG. 7, a memory reclamation event may be detected in numerous ways, such as determining that available memory is below a memory reclamation threshold, receiving an indication or notification from a component or module of the virtual host implementing the memory-managed runtime environment, such as a timer, or various other ways of detecting that memory may need to be reclaimed.

Detection of a memory reclamation event may trigger or begin a scheduling process or technique for performing a memory reclamation operation. For example, in some embodiments, a simple delay or wait period may be enforced before performing the memory reclamation operation. In some embodiments, this delay or wait period may be randomized. As indicated at 920, a scheduling instruction may be generated for the memory reclamation operation for the service process, in various embodiments. The scheduling instruction may be generated based, at least in part, on currently performing or scheduled memory reclamation operations for other service processes in the network-based service (on a same or different node/virtual host). Consider the example given above, where different compute nodes (or virtual hosts) in distributed network-based system direct service requests to one another. Each compute node may implement some form of load balancer (or similar component) to select from among other compute nodes to direct service requests. Nodes in the distributed system may heartbeat (e.g., send periodic or aperiodic notifications) to one another, which may include information such as currently scheduled memory reclamation operations for the node (e.g., when the operation will be performed). A lack of a heartbeat notification from a particular node may also indicate that the particular compute node is currently performing a memory reclamation operation (an unable to heartbeat). In the other scenario described above, where a load balancing system directs requests to different service process among service processes on nodes/virtual hosts in a network-based service, the load balancer may maintain state information (e.g., as part of memory reclamation manager 384 or 412 described above with regard to FIGS. 3, 4A, and 4B) about the different service processes, such as whether a process is scheduled to perform a memory reclamation operation or is currently performing a memory reclamation operation.

As noted above, based, at least in part, on the currently scheduled and/or currently performing memory reclamation techniques, a scheduling instruction may be generated for the memory reclamation operation for the service process. The scheduling instruction may be generated by applying a rules-based engine, applying various policies, or any other form of scheduling or decision making technique. For example, an availability policy for the network-based service may specify a number or percentage or service processes be available at any given time in order to perform service requests. The scheduling instruction may enforce the policy by instructing a delay, specific time, or other indication of when to perform the memory reclamation operation so as not to violate the policy. In some embodiments, an instruction may be made to perform a background garbage collection technique for a service process if no available time for performing the memory reclamation technique satisfies the policy. In some embodiments, the scheduling instruction may be an indication that a memory reclamation lock may need to be acquired in order to perform the memory reclamation operation, or that a lock for performing memory reclamation has been acquired (e.g., from another compute node/host) and that the memory reclamation operation may be performed.

As stated, the scheduling instruction itself may include an indication of when to perform the memory reclamation operation, such as a specific time (or an instruction to delay for a period of time). In some embodiments, the scheduling instruction may be generated by the component performing the memory reclamation operation (e.g., service process, memory-managed runtime environment, or the virtual host). Thus, memory reclamation operation scheduling may be performed independently for each process, host, node, etc. . . . . However, in some embodiments, a load balancer or other similar component that directs service requests among service processes may generate scheduling instructions for multiple different service processes among different nodes, hosts, and/or memory-managed runtime environments. For example, the scheduling instruction may be sent in response to a memory reclamation agent that has sent a notification of detecting a memory reclamation event.

As indicated at 930, the memory reclamation operation may be performed in accordance with the scheduling instruction. Thus, for example, if the scheduling instruction indicates a particular time to perform the memory reclamation operation, the service process may continue to process service requests until that particular time. Similarly a delay or other indication of when to perform a memory reclamation operation may be enforced by the memory reclamation agent (or other component performing the memory reclamation techniques described herein).

Figure 10:
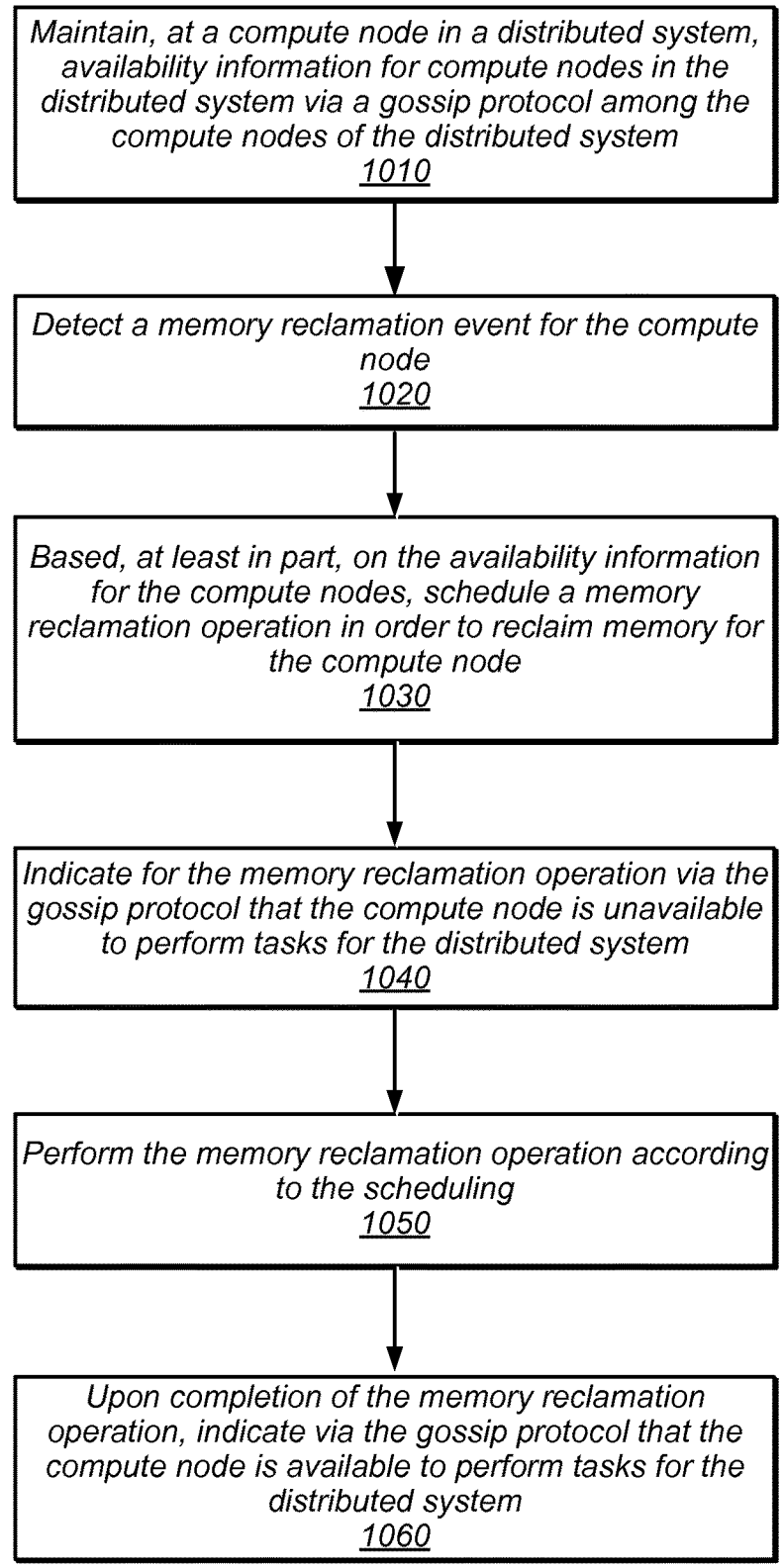
FIG. 10 is a high-level flowchart illustrating various method and techniques for implementing efficient storage reclamation for compute nodes in a distributed system, according to some embodiments.

In some embodiments, compute nodes, or other components of a distributed computing system may be configured to independently dispatch requests and/or make determinations as to whether to perform tasks at a compute node. For example, in some embodiments, a distributed system may implement a gossip protocol among compute nodes to indicate, among other information, whether or not a particular compute node is available to perform tasks for the distributed system. FIG. 10 is a high-level flowchart illustrating various method and techniques for implementing efficient storage reclamation for compute nodes in a distributed system, according to some embodiments.

As indicated at 1010, availability information for compute nodes in a distributed system obtained via a gossip protocol among the compute nodes of the distributed system may be maintained at a compute node in the distributed system, in some embodiments. For example, compute nodes may periodically poll one or more other compute nodes for availability, receive updates, notifications, or other information from another compute node indicating that compute node's or another compute nodes availability, or more generally implement any kind of gossip protocol or scheme to communicate availability information among the compute nodes of a distributed system. This data may be updated when changes are received at a compute node.

As indicated at 1020, in some embodiments, a memory reclamation event for a compute node may be detected. As discussed above, a memory reclamation event may be detected in various ways, such as a reclamation threshold, one or more error or other messages about the available memory for the compute node, a time period, such as time elapsed since the last performance of a memory reclamation operation, or the workload of task performed, or type of tasks which the compute node has performed. As indicated at 1030, based, at least in part, on the availability information for the compute nodes, a memory reclamation operation may be scheduled in order to reclaim memory for the compute node. For example, various performance guarantees as to the number of available compute nodes may be enforced, limiting the number of compute nodes that may be voluntarily unavailable at any time. In another example, the availability information may be used to identify particular time windows during which a memory reclamation operation may be performed. These examples, as well as the scheduling examples discussed above may be used to schedule the memory reclamation operation, in some embodiments.

As indicated at 1040, an indication for the memory reclamation operation may be made via the gossip protocol that the compute nodes is unavailable to perform tasks for the distributed system, in some embodiments. For example, while performing the memory reclamation operation, the compute node may broadcast that it is unavailable, or it may not respond to requests for availability information. Various other techniques as may be utilized to satisfy the gossip protocol may be implemented, and as such, the previous examples are not intended to be limiting. Thus, the timing of indication via the gossip protocol and/or the duration of the indication may vary in different embodiments.

As indicated at 1050, the memory reclamation operation may be performed according to the scheduling, in some embodiments. As described above with regard to FIGS. 6 and 7, a memory reclamation technique may generally be any technique to reclaim memory (or other storage) for the compute node that is no longer used by the compute node. Many memory reclamation operations are implemented by various garbage collection techniques, which are well-known to those of ordinary skill in the art. One such garbage technique that may be implemented in some embodiments is a stop-the-world garbage collection technique. A stop-the-world garbage collection technique may halt processing of current service requests by the service process, perform garbage collection (e.g., using move and compact garbage collection), and then resume processing of service requests. In some embodiments, a delay or wait period may be implemented before performing the stop-the-world garbage collection technique. For example, short-lived service requests may be completed prior to performing the technique so as not to increase service latency. Long-running techniques, however, may in various embodiments be paused while garbage collection is performed.

Upon completion of the memory reclamation operation, an indication may be made via the gossip protocol that the compute node is available to perform tasks, as indicated at 1060. This indication, as discussed above with regard to element 1040, may conform to the particular gossip protocol implemented among the compute nodes of the distributed system.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the data storage services/systems and/or storage services/systems described herein). The various methods as illustrated in the figures and described herein represent example embodiments of methods. The order of any method may be changed, and various elements may be added, reordered, combined, omitted, modified, etc.

Figure 11:
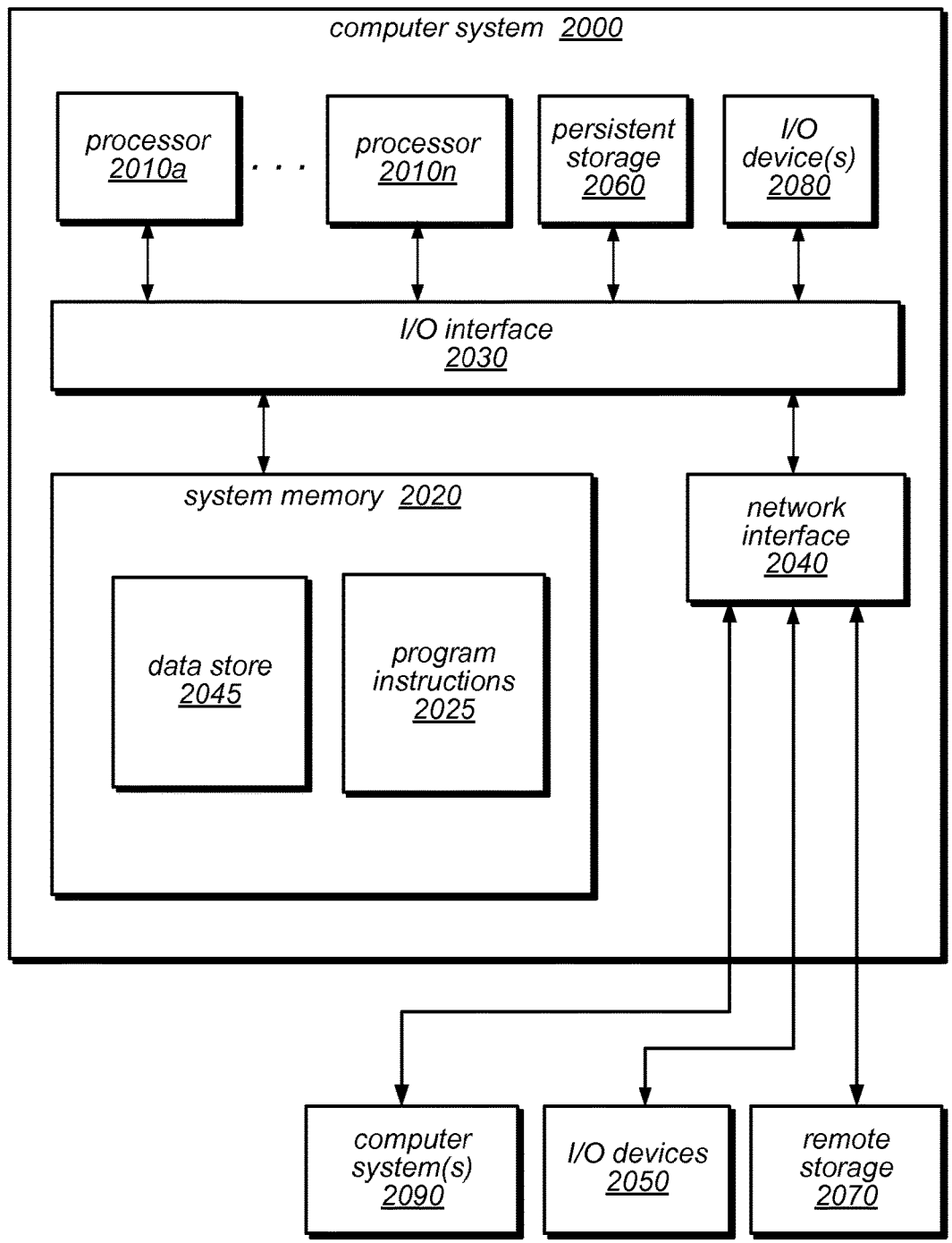
FIG. 11 is a block diagram illustrating an example computing system, according to some embodiments.

Embodiments of implementing efficient storage reclamation for system components managing storage as described herein may be executed on one or more computer systems, which may interact with various other devices. FIG. 11 is a block diagram illustrating an example computer system, according to various embodiments. For example, computer system 2000 may be configured to implement nodes of a network-based service, virtual hosts, memory-managed runtime environments, a load balancer (or other network-based service component) and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the data warehouse system described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, the program instructions 2025 may include program instructions executable to implement the various components illustrated in the different embodiments. In some embodiments, program instructions 2025 may implement multiple separate clients, nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a plurality of computing devices comprising respective processors and memory to implement a plurality of compute nodes that together implement a network-based service;
   at least some of the plurality of compute nodes each implementing a memory-managed runtime environment for a respective one or more service processes operating at the compute node and a respective one or more memory reclamation agents for the respective one or more service processes;
   a different one or more compute nodes of the plurality of compute nodes together implementing a load balancer directing service requests to the respective one or more service processes at the at least some compute nodes, wherein the load balancer maintains reclamation information indicating currently performing or currently scheduled reclamation operations for the respective one or more service processes; and
   the one or more memory reclamation agents, each configured to:
      obtain the reclamation information from the load balancer;
      detect a memory reclamation event for one of the respective one or more service processes;
      based, at least in part, on currently performing or scheduled reclamation operations of one or more other service processes of the service processes indicated in the reclamation information, generate a scheduling instruction for a memory reclamation operation for the service process;
      indicate to the load balancer that the service process is unable to process further service requests for the network-based service in order to perform memory reclamation;
      perform the memory reclamation operation in accordance with the scheduling instruction in order to reclaim at least some memory for the service process; and
      upon completion of the memory reclamation operation, indicate to the load balancer that the service process has resumed processing service requests.

2. The system of claim 1, wherein to perform the memory reclamation operation in order to reclaim the at least some memory for the service process, the one or more memory reclamation agents are each further configured to:
   halt processing of previously routed service requests; and
   reclaim one or more portions of memory according to a garbage collection technique.

3. The system of claim 1, wherein to perform the memory reclamation operation in order to reclaim the at least some memory for the service process, the one or more memory reclamation agents are each further configured to restart the service process in order to clear the memory for the service process.

4. The system of claim 1,
   wherein, to indicate to the load balancer that the service process is unable to process further service requests for the network-based service, the one or more memory reclamation agents are each further configured to fail health checks received from the load balancer;
   wherein, to indicate to the load balancer that the service process has resumed processing service requests, the one or more memory reclamation agents are each further configured to resume passing health checks received from the load balancer.

5. The system of claim 4,
   wherein to detect the memory reclamation event, the memory reclamation agent for the service process is configured to determine that an amount of available memory for the service process has fallen below a memory reclamation threshold.

6. A method, comprising:
   performing, by one or more computing devices:
      obtaining, at a system component, reclamation information indicating reclamation operations currently being performed by or scheduled by one or more other system components for one or more service processes of the one or more other system components, wherein the system component and the one or more other system components perform storage management implemented as part of a system;
      detecting a storage reclamation event for a service process operating at the system component;
      based, at least in part, on the reclamation operations currently being performed by or scheduled by the one or more other system components for the one or more service processes of the one or more other system components indicated in the reclamation information, generating by the system component a scheduling instruction for a storage reclamation operation for the service process operating at the system component;
      indicating to a request distribution mechanism for the system that the system component is unable to process further requests for the system, wherein said indicating is performed by one of the one or more computing devices distinct from another computing device implementing the request distribution mechanism;

performing the storage reclamation operation in accordance with the scheduling instruction in order to reclaim at least some storage for the system component; and upon completion of the storage reclamation operation, indicating to the request distribution mechanism that the system component has resumed processing requests.

7. The method of claim 6, wherein the storage event is a memory reclamation event, wherein the request distribution mechanism is a load balancer, wherein the system component is a compute node of a plurality of compute nodes in a distributed system, and wherein the storage reclamation operation is a memory reclamation operation that reclaims memory for the service process.

8. The method of claim 7, wherein said detecting the memory reclamation event for the compute node comprises determining that an amount of available memory for the compute node falls below the memory reclamation threshold.

9. The method of claim 8, wherein different respective memory reclamation thresholds for each of the plurality of compute nodes are utilized such that said detecting the memory reclamation event, indicating to the load balancer, said performing the memory reclamation operation, and said indicating to the load balancer that the service process is available are performed for the plurality of compute nodes in satisfaction of a latency requirement for service requests directed toward the network-based service.

10. The method of claim 7,
wherein said indicating to the load balancer for the distributed system that the compute node is unable to process further requests for the distributed system, comprises failing health checks from the load balancer;
wherein said indicating to the load balancer that the compute node has resumed processing service requests, comprises resuming passing health checks from the load balancer.

11. The method of claim 7, wherein said detecting the memory reclamation event, said indicating to the load balancer that the compute node is unavailable, said performing the memory reclamation operation, and said indicating to the load balancer that the service process has resumed processing are performed by a service process implemented in a memory-managed runtime environment at the compute node.

12. The method of claim 7, wherein the memory reclamation operation comprises:
a stop-the-world garbage collection technique; or
a process restart.

13. The method of claim 7, further comprising:
performing, by another one or more computing devices implementing the load balancer:
determining that the compute node is unavailable to process requests in order to perform memory reclamation;
removing the compute node from a load balancing scheme for directing requests to the plurality of compute nodes;
determining that compute node is available to process requests; and
including the compute node in the load balancing scheme.

14. The method of claim 7, wherein the distributed system is a network-based, virtual computing service.

15. A non-transitory, computer-readable storage medium, storing program instructions that when executed by a computing device cause the computing device to implement:
maintaining, at a compute node, availability information for a plurality of compute nodes implementing a distributed system including the compute node, wherein the availability information is obtained via a gossip protocol among the plurality of compute nodes, wherein the availability information for the plurality of compute nodes is based on at least one memory reclamation operation scheduled by or performed by one or more other compute nodes of the plurality of compute nodes, wherein the plurality of compute nodes perform tasks for the distributed system;
detecting a memory reclamation event for the compute node;
based, at least in part, on the at least one memory reclamation operation scheduled by or performed by the one or more other compute nodes of the plurality of compute nodes, scheduling, by the compute node, a memory reclamation operation at the compute node to reclaim memory for the compute node;
performing the memory reclamation operation according to the scheduling, wherein an indication for the memory reclamation operation via the gossip protocol indicates, by the compute node to one or more other compute nodes of the plurality of compute nodes, that the compute node is unavailable to perform tasks for the distributed system; and
upon completion of the memory reclamation operation, indicating via the gossip protocol the compute node is available for performing tasks for the distributed system.

16. The non-transitory, computer-readable storage medium of claim 15, wherein the memory reclamation operation comprises:
a stop-the-world garbage collection technique; or
a process restart.

17. The non-transitory, computer-readable storage medium of claim 16, wherein the program instructions further cause the computing device to implement selecting the memory reclamation operation to perform based, at least in part, on currently processing requests at the compute node.

18. The non-transitory, computer-readable storage medium of claim 15, wherein the garbage collection event is detected for a service process implemented at the compute node to perform tasks for the distributed system, and wherein the service process is implemented in a memory-managed runtime environment.

19. The non-transitory, computer-readable storage medium of claim 15, wherein, in said detecting the memory reclamation event for the compute node, the program instructions cause the computing device to implement determining that an amount of available memory for the compute node falls below a memory reclamation threshold.

20. The non-transitory, computer-readable storage medium of claim 15, wherein the distributed system is a network-based, multi-tenant, data storage service.

* * * * *